United States Patent [19]

D'Hondt

[11] 4,128,965
[45] Dec. 12, 1978

[54] PLANT STAKE

[76] Inventor: August J. D'Hondt, Rte. 2, Box 385, Sonora, Calif. 95370

[21] Appl. No.: 803,608

[22] Filed: Jun. 6, 1977

[51] Int. Cl.$^2$ .................................................. A01G 17/06
[52] U.S. Cl. ........................................ 47/47; D23/47; 47/70; 277/207 R; 343/901; 403/278
[58] Field of Search .......................... 47/45, 46, 47, 70; 43/18, 18 GH; 343/901, 902, 903, 823; 285/DIG. 11, DIG. 19; 85/50; D23/47; 403/282, 279, 278, 280, 281; 277/143, 145, 189, 190, 181, 185, 178, 207 R, 213, 214

[56] References Cited

U.S. PATENT DOCUMENTS

| D. 21,194 | 12/1891 | Chisholm | D23/47 |
|---|---|---|---|
| D. 48,004 | 10/1915 | Mueller | D23/47 |
| 250,929 | 12/1881 | Lewis | 277/213 |
| 1,740,560 | 12/1929 | Andrews | 43/18 R |
| 1,942,750 | 1/1934 | Eue | 47/47 |
| 2,914,922 | 12/1959 | Gibson | 343/901 X |
| 3,165,863 | 1/1965 | Duran | 47/47 |
| 3,299,766 | 1/1967 | Gould et al. | 85/50 R X |
| 3,468,052 | 9/1969 | Hardesty et al. | 43/18 R X |
| 3,735,664 | 5/1973 | Hermle | 85/50 R X |

FOREIGN PATENT DOCUMENTS

| 1343668 | 10/1963 | France | 43/18 R |
|---|---|---|---|
| 89640 | 6/1967 | France | 43/18 R |
| 1539112 | 8/1968 | France | 43/18 R |
| 1957603 | 5/1971 | Fed. Rep. of Germany | 47/47 |
| 923129 | 4/1963 | United Kingdom | 285/DIG. 19 |
| 965771 | 8/1964 | United Kingdom | 277/178 |
| 1404974 | 9/1975 | United Kingdom | 47/75 |

*Primary Examiner*—Edgar S. Burr
*Assistant Examiner*—James R. Feyrer
*Attorney, Agent, or Firm*—John E. Wagner

[57] ABSTRACT

A telescoping plant stake employing a number of telescoping tubular elements, each of which are fitted with a highly resilient friction element at their inner end. The friction element is secured in a groove with its outermost surface extending slightly above the surface of the tubular member with which it is associated and includes a plurality of diamond like protuberances spaced around the periphery which assume compressive engagement with the encircling tube for that member.

3 Claims, 4 Drawing Figures

PLANT STAKE

BACKGROUND OF THE INVENTION

The traditional plant holding stake has been either a piece of wood or in certain circumstances, bark which is inserted in a pot for outdoor or indoor plants and inserted on the ground adjacent to the plant for outdoor plants. Such wooden stakes typically are not adjustable in height and are placed when the plant is young, selected so they will have sufficient height throughout the growing life of the plant. If the plant is an ornamental plant, the plant stake invariably detracts from the overall appearance. For this reason, such natural appearing materials such as bark stakes have been used and conventional wooden stakes have been stained in a natural color such as green or brown. Still they obviously present the appearance of a foreign element in the environment.

A number of telescoping plant stakes have been developed of simple design and some include such complex additions as automatic waterer's and the like using the body of the plant stake as a conduit for water from an uppermost reservoir.

Despite the many telescoping plant stakes which have been developed, none have reached the acceptance of the market place to any extent for a number of reasons. One is that producing a telescoping stake of any size and any number of sections is significantly more expensive than a simple wooden stake. More importantly, plant stakes of a telescoping variety have quite often been unreliable in holding their position. It is essential that a telescoping plant stake be extended to the required length whereupon it provides support for the leaves but also maintains its position without collapsing.

BRIEF STATEMENT OF THE INVENTION

I have combined in a simple, low cost telescoping plant stake ease of adjustment plus reliable positioning to afford steady support for a plant and assurance that it will not collapse despite the normal movement and forces encountered when a plant is bent or accidently brushed by a passerby. It involves basically an improved friction element secured to the inner end of each telescoping section which engages the interior wall of its enclosing section in a number of spaced points and at intimate local contact with the enclosing sections.

BRIEF STATEMENT OF THE DRAWINGS

This invention may be more clearly understood from the following detailed description and by reference to the drawing in which FIG. 1 is a perspective view of a plant stake in accordance with this invention in its normal use and with an indoor plant;

DETAILED DESCRIPTION OF THE INVENTION

Figure 1:
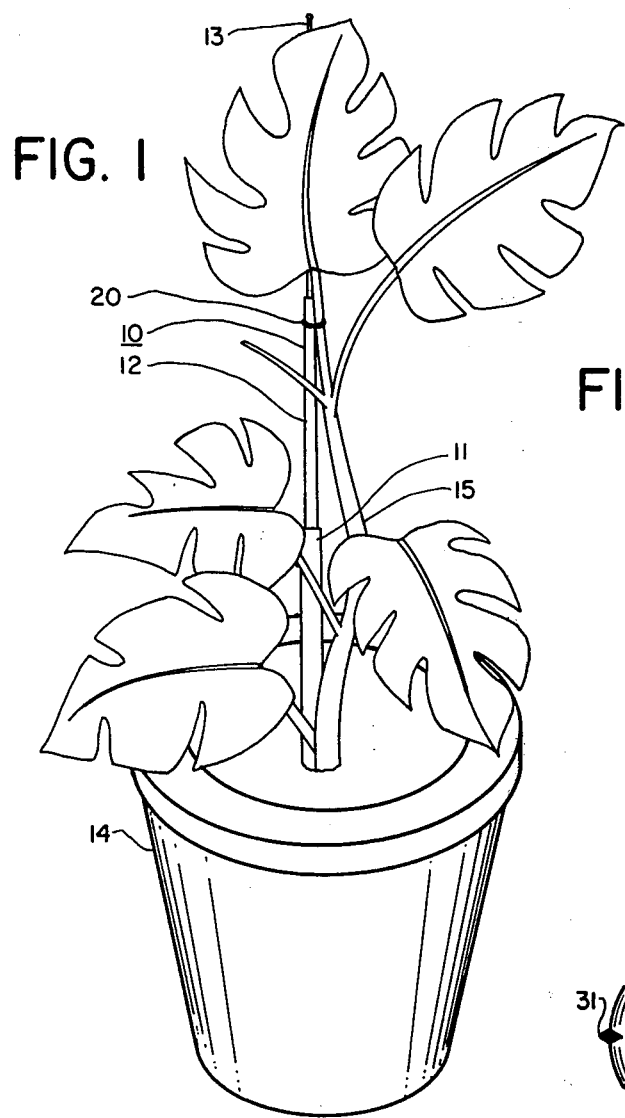

Now referring to FIG. 1, a plant stake 10 in accordance with this invention may be seen as including a plurality of, for example, three sections, 11, 12, and 13, respectively, which are telescoping to allow adjustment of the height of the stake to the requirements for plant support. The stake is located in a pot 14 holding a plant 15 which is secured to the stake by one or more plant ties 20. The plant stake 10 by its adjustable feature, allows it to be elongated only to the distance required and as the plant ties 20. When moved to a new position by slight finger pressure, the user may be assured that it will remain at that elongated position as long as he so desires. The plant stakes of this invention are preferably of natural color, e.g. green, plastic of materials which are non-corrosive and inert with respect to planter mix and the plant. Employing plastic material, the color may be molded in permanently.

Figure 2:
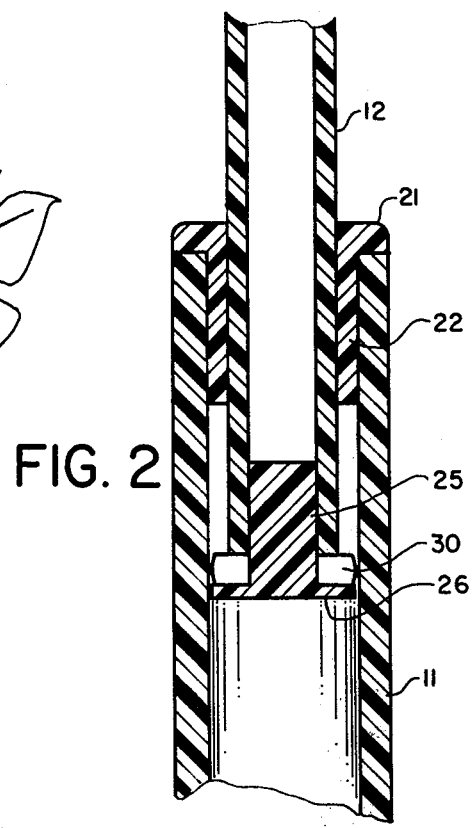
FIG. 2 is an enlarged fragmentary vertical section through a joint of the plant stake of FIG. 1.

Now referring to FIG. 2, the details by which the plant stakes of this invention may be maintained accurately positioned may be seen. FIG. 2 shows a section through the junction between the telescoping tubular members 11 and 12, however, it is identical except for size with the similar junctions between the telescoping members 12 and 13.

Figure 3:
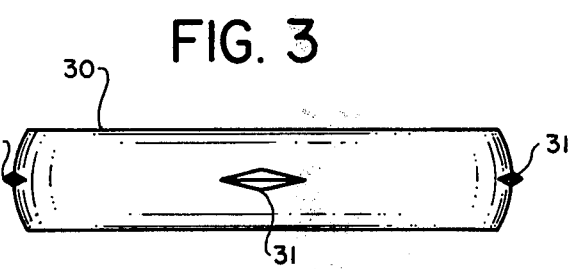
FIG. 3 is a further enlarged side view of the friction member of FIG. 2.
Figure 4:
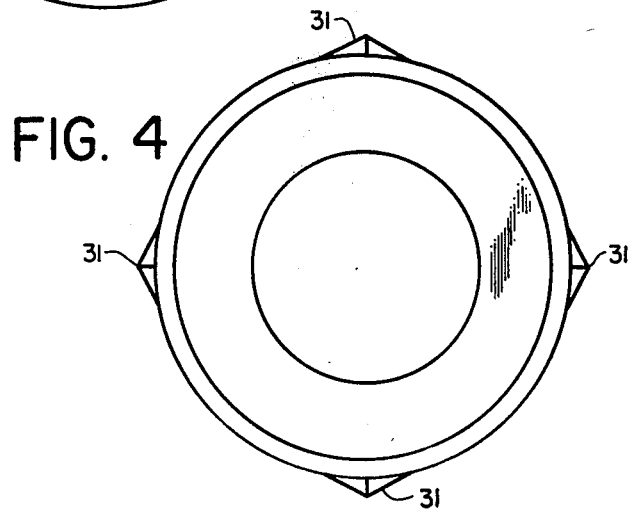
FIG. 4 is a top plan view of the friction member of FIGS. 2 and 3.

In FIG. 2 it may be seen that the telescoping member 11 includes at its upper end a collar 21 with a tubular extension tube 22. This collar 21 is typically of molded plastic material and is cemented in place to the tube 11 after the tube 12 assembly has been inserted. The tube 12 at its lower end includes a plug 25 having an outer flange 26 at its lower end. The plug extends into the interior of the tube 12 and similar to the collar 21 is cemented in place. Between the end of tube 12 and the inner face of the flange 26, the washer 30 of this invention is located within an annular groove defined by the end of the tube 12, a portion of the plug 25 and the inner face flange 26. The washer of friction element 30 ring is made of a soft elasomeric material such as polyvinyl chloride of 40 shore hardness and includes the shape of basically 0 ring configuration with the exception that it includes spaced protuberances 31 best seen in FIGS. 3 and 4, on the outer surface in diamond like configuration. In the drawing FIG. 4, it may be seen that for such diamond like protuberances, 31 are employed. In FIG. 2 as may be apparent, the protuberances are substantially compressed by engagement with the inner wall of tube 11 so that the washer 30 takes on the general appearance of an O ring. It has been found however than when plain surfaced O rings have been employed, an unsatisfactory holding results. The addition of protuberances by way of contrast provide descrete areas in a high degree of compressive stress and locally engage the outer tube 11. The use of the protuberances 31 allows light finger adjustment of the extent of elongation of the tubes 11–13 without a loss of resiliency or sticking as often occurs in O ring type telescoping members. It must be recognized that when a plant is in place and a plant stake is present, only a light force is wanted to make the size adjustment to avoid any unnecessary disturbance of the plant and root structure. By the addition of the protuberances as so described, a reliable easily adjusted but solidly holding telescoping plant stake has been achieved.

The above described embodiments of this invention are merely descriptive of its principles and are not to be considered limiting. The scope of this invention instead shall be determined from the scope of the following claims including their equivalents.

What is claimed is:

1. A telescoping plant stake comprising at least two telescoping members, the outer of which is tubular;

a plug having a flange on one end and having its other end inserted in the lower end of the inner most of said telescoping members, said flange and said lower end defining an annular groove, a generally annular elastomeric friction member secured in said groove and having an outer periphery which is convex in cross-section said outer periphery having a plurality of outward extending local protuberances;

said protuberances having a height sufficient that when the outer and inner members are assembled, said protuberances are in compressed contact with the inner wall of said outer tube, said protuberances including tapers extending in each direction of telescoping movement of said telescoping members.

2. The combination in accordance with claim 1 wherein said protuberances are generally pointed.

3. The combination in accordance with claim 2 in which said protuberances are generally pyramidal in shape.

* * * * *